United States Patent [19]

Anderson

[11] 4,048,752
[45] Sept. 20, 1977

[54] SUPPORTS

[76] Inventor: Howard Anderson, Accord, N.Y. 12404

[21] Appl. No.: 634,335

[22] Filed: Nov. 24, 1975

[51] Int. Cl.² .................................................. A01G 17/14
[52] U.S. Cl. ......................................................... 47/47
[58] Field of Search .................... 47/34.7, 39, 44–47; 248/121–125, 156, 511–519; 108/94, 95; 343/810

[56] References Cited

U.S. PATENT DOCUMENTS

| 1,556,373 | 10/1925 | Thoeni | 47/47 |
| 2,546,460 | 3/1951 | Leeds | 248/122 |
| 2,790,269 | 4/1957 | Coleman, Jr. | 47/34.7 |
| 2,980,261 | 4/1961 | Young, Jr. | 211/166 |
| 3,285,554 | 11/1966 | Voelkerding | 248/156 X |
| 3,572,045 | 3/1971 | Owen | 248/156 X |
| 3,778,929 | 12/1973 | Pearson | 47/47 |
| 3,805,965 | 4/1974 | Champagne | 108/94 X |

FOREIGN PATENT DOCUMENTS

| 236,187 | 1/1945 | Switzerland | 47/47 |

Primary Examiner—Edgar S. Burr
Assistant Examiner—James R. Feyrer
Attorney, Agent, or Firm—Strauch, Nolan, Neale, Nies & Kurz

[57] ABSTRACT

A multisectional support useful as a trellis and for other purposes. Each section includes one or more components to which the corresponding components of super- and/or subjacent sections can be assembled and a supporting member attached to and surrounding the first-mentioned components.

4 Claims, 5 Drawing Figures

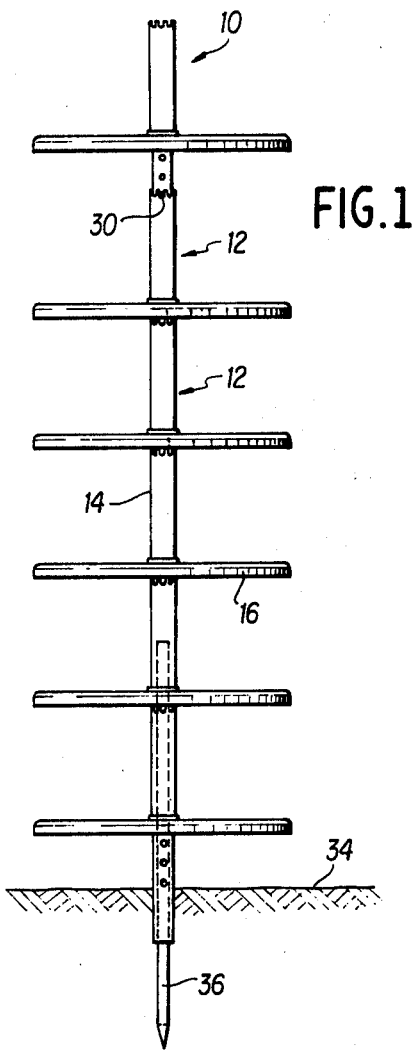
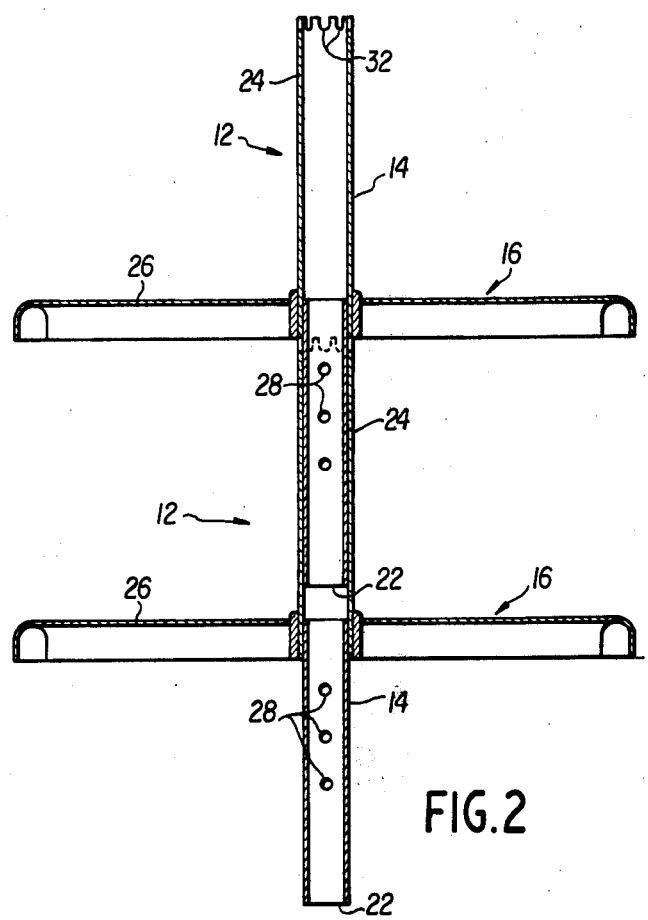
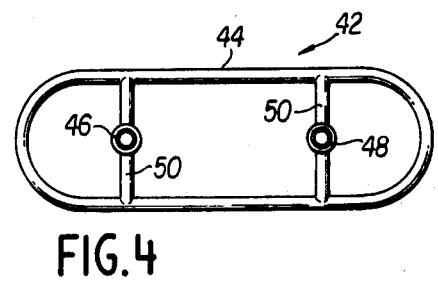
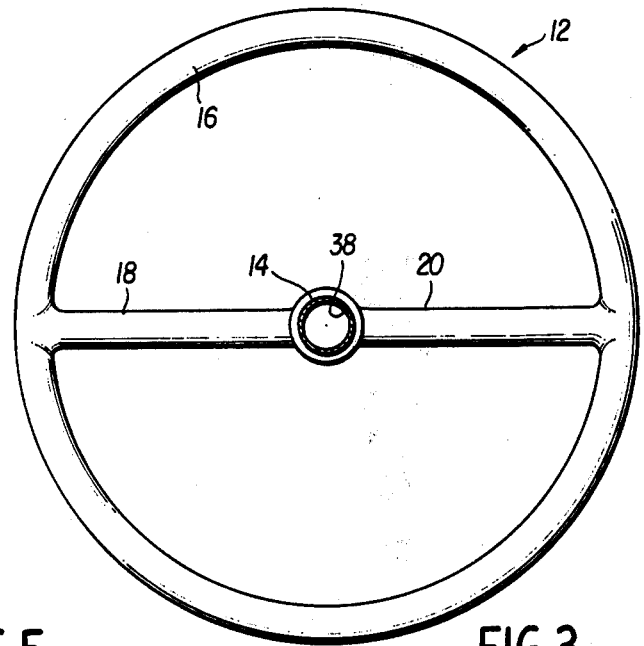
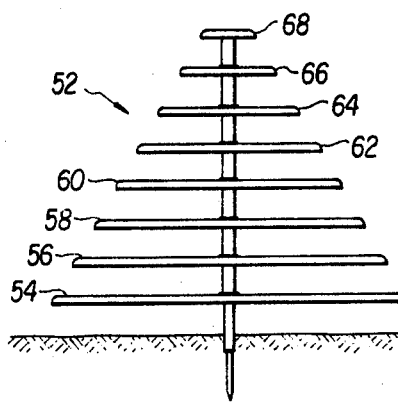

SUPPORTS

This invention relates to supports and, more specifically, to novel, improved, vertical supports of the multisectional type.

My novel supports are particularly useful as trellises for vine-type plants - for example, tomatoes, roses, sweet peas, etc. The principles of the present invention will accordingly be developed primarily by reference to such applications.

It is to be understood however, that this is only for the sake of convenience as my novel supports can equally well be used for other purposes. For example, colored lights can be strung through them for Christmas decorations.

Manufactured supports, intended for the first of the purposes identified above are disclosed in U.S. Pat. No. 2,764,846 issued Oct. 2, 1956, to Worthington for PLANT SUPPORT. Supports as described in that patent have a number of disadvantages.

They would be relatively expensive to manufacture because assembly would have to be followed with a not uncomplicated wire forming operation. Also, the height of the support can be varied only within the narrow limits which result from driving the main member to different depths in the ground. In addition, the distance between the components which actually support the plant cannot be varied.

U.S. Pat. No. 1,556,373 issued Oct. 6, 1925, to Thoeni does disclose a plant support with adjustable spacing between the components which actually support the plant and, by virtue of this feature, an adjustable height. However, the changes in height which can be obtained are limited; and the support is too complex to be economically practical.

Roger (U.S. Pat. No. 2,763,096 issued Sept. 18, 1956) discloses a sectional plant support which has the advantage that the height can be increased indefinitely. However, this is achieved only by a highly complicated structure. Furthermore, there is no provision for varying the spacing between the plant suporting components.

I have now invented novel supports which are free of the disadvantages discussed above. These supports are composed of plural sections or members, each having a tubular hub and an object supporting component surrounding and fixed to the hub. The ends of the hubs are dimensioned to telescopically engage the apposite ends of adjacent members; and a series of vertically spaced, pin receiving, horizontally aligned openings in the smaller ends of the hubs permit the spacing between the object supporting components of adjacent members to be varied.

Being of multisectional character, the novel supports just described can be made as high as desired. And the spacing between object supporting components can be varied in a simple manner which adds little to the cost of the support members. Futhermore, the latter are of a configuration which permits them to be molded from plastic or easily fabricated from other materials although they can also be made from plural parts, if desired.

Yet another advantage of the novel construction just described is that there is an axial passage through the center of the support. If desired, a stake or rod can be inserted through this passage at the top of the support, or at any intermediate level, and driven into the ground to lend added stability to the support.

Still another important advantage of my novel supports in those applications where they are used as trellises is that they are self-contained. There is no need to tie the plant parts to the support as is typically the case with conventional supports.

Still another advantage of my novel supports is versatility. It was pointed out above that they can be fabricated from a variety of materials — there are many suitable metals and plastics.

Also, the object supporting components of the sections can be of circular, elliptical, or virtually any other configuration. This permits the support to be given the optimum configuration for a particular application and/or to be given a configuration which will produce a wanted shape or outline, for example.

From the foregoing it will be apparent to the reader that it is the primary object of my invention to provide a novel, improved, vertical support.

Other important but more specific objects of the invention reside in the provision of supports in accord with the preceding object:

a. which are, comparatively, inexpensive to make;
b. which can be readily made from a variety of materials and in a variety of shapes and sizes;
c. which can be made as tall as desired;
d. which are of multisectional construction and which have a simple arrangement for varying the spacing between adjacent members;
e. which have a central hub into which a component for lending stability to the support can be inserted;
f. which, when used as trellises, will not damage the plants and do not require strings or other ties;
g. which have various combinations of the foregoing attributes.

Other objects and features and additional advantages of my invention will become apparent from the appended claims and as the ensuing detailed description and discussion proceeds in conjunction with the accompanying drawing, in which:

FIG. 1 is an elevation of a multisectional support constructed in accord with and embodying the principles of the present invention;

FIG. 2 is a vertical section through a part of the support;

FIG. 3 is a plan view of one of the members of which the support is composed;

FIG. 4 is a plan of a second view of a second member which can be asembled into supports in accord with the principles of the present invention; and FIG. 5 is an elevation of yet another support constructed in accord with the principles of the present invention.

Referring now to the drawing, Fig. 1 depicts a vertical, multisectional support 10 embodying and constructed in accord with the principles of the present invention. Support 10 is composed of six, telescopically engaged, support sections or members 12 each having a vertically extending, tubular hub 14; a circular supporting component 16 surrounding the hub; and axially aligned spokes 18 and 20 for supporting component 16 from hub 14 (see FIG. 3).

As best shown in FIG. 2, the external dimensions of the lower parts 22 of the hubs are made the same as the internal dimensions of the upper parts 24 so that each member 12 can be telescopically connected to the adjacent member or members.

In the illustrated embodiment of the invention, the circular support components 16 have a generally U-shaped cross section with a semicircular upper surface 26. When support 10 is employed as a trellis, the section of the support components should be at least 0.5 inch wide. If they are narrower, damage to the plant may result as applicant has demonstrated by employing supports as illustrated but with the components 16 made of 0.25 inch diameter wire as for tomato plants. The plants bent and kinked as they grew over the supporting components, and the production of fruit was decidedly inferior.

Vertically spaced, horizontally aligned apertures 28 are formed in opposite sides of lower hub sections 22 as shown in FIG. 2. By inserting a pin 30 through a selected pair of apertures 28 (see FIG. 1), the distance between the supporting components 16 of adjacent members 12 can be readily adjusted.

As best shown in FIG. 2, notches 32 of approximately the same width as apertures 28 are formed in the upper ends of support member hubs 14. Pins 30 fit in these apertures and keep the members 12 from rotating with respect to each other.

As discussed above, the members 12 making up support 10 can be molded from plastic, fabricated from different metals, etc. In one typical embodiment of the invention, the hubs 14 of the members are 12 inches long, and the external diameter of the lower section and the internal diameter of the upper section are about one inch. In this exemplary embodiment of the invention, the circular support components 16 have a twelve inch diameter and are 0.5 inch wide and 0.75 inch deep. Apertures 28 are spaced 1 inch apart.

As suggested above, the hubs, rims, and support components of sectional support members in accord with the principles of the present invention can also be separate parts. This may reduce manufacturing costs and/or facilitate packaging in particular applications of my invention.

In addition, this permits one hub to be used in support sections of various shapes and sizes which is also attractive from the economic point-of-view.

A support as just described can be supported simply by pushing the lower section 22 of the bottom member 12 into the ground as shown in FIG. 1 in which the surface of the ground is identified by reference character 34. For added stability, a stake 36 can be driven into the ground through the hollow, central bores 38 in the hubs 14 of one or two or more members 12 (see FIG. 3).

It is of course not necessary that the members of a support embodying the principles of the present invention have the configuration shown in FIGS. 1 and 3. FIG. 4, for example, shows a support member 42 in which the supporting components 44 are generally rectangular with arcuate ends. In this particular arrangement, which is intended to be employed as a rose arbor, for example, the support components 44 will typically be 1 foot wide and three feet long. Accordingly, in the interest of producing adequate stability, two hubs 46 and 48 of the character described above are provided. These are connected to supporting component 44 by spokes identified generally by reference character 50.

In support sections of the character just described multi-part construction can be employed to particular advantage because hubs 46 and 48 can be identical so that only a single hub design is required.

Futhermore, it is not necessary that all of the members making up a support employing the principles of the present invention be identical. FIG. 5, for example, shows a support 52 in which succeeding members 54 . . . 68 are of the configuration and construction shown in FIGS. 1-3 but of progressively smaller diameter, giving the support a conical or treelike configuration. An attractive Christmas decoration may be produced by stringing lights on a support of this configuration.

Still other embodiments of the invention will readily occur to those skilled in the arts to whom this specification is directed. For example, still other configurations of the supporting components of those members making up the support can be employed, and the number of spokes can be varied. Also, by replaing stake 36 with a base having an upwardly extending shaft, supports in accord with the present invention can be employed on hard surfaces and indoors as well as out of doors. Accordingly, to the extent that they are not expressly excluded from the appended claims, all supports embodying the principles of the present invention are fully intended to be embraced therein. That is, the present embodiments are to be considered in all respects as illustrative and not restrictive, the scope of the invention being indicated by the appended claims rather than by the foregoing description; and all changes which come within the meaning and range of equivalency of the claims are intended to be embraced therein.

What is claimed and desired to be secured by Letters Patent is:

1. A multisectional plant support and base adapted to be employed in a generally vertical orientation, said multisectional support comprising: a plurality of support members, each said member comprising a tubular hub and a support component surrounding and fixed to said hub, the hub component of each said member including a first, upwardly extending tubular member and a second, downwardly extending member having its upper end extending into and fixed to the lower end of the upwardly extending member, said downwardly extending member also having an external diameter which is substantially equal to the internal diameter of the upwardly extending member, each of said upwardly extending tubular members being identical to each other and each of said downwardly extending members being identical to each other, a lowermost one of said support members being said base for said multisectional support, whereby said support members can be telescopically mounted and supported one above the other onto said lowermost support member with the lower end of the upwardly extending tubular hub member of each but said lowermost support member engageable with the upper end of the corresponding tubular member of the support member therebeneath to thereby vertically space apart the support components of the support members by distances determined by the lengths of said upwardly extending tubular hub members.

2. A multisectional plant support and base as defined in claim 1, together with means for vertically spacing apart said support components and for preventing relative rotation between support members comprising vertically spaced apart apertures through the downwardly extending hub member of each support member and a pin insertable through a selected one of said apertures, said pin thereby being engageable with the upper end of the upwardly extending tubular member of the next lower support member to thereby vertically space the support components of the support members apart by a distance determined by the location of said pin, there being notches in the upper end of the upwardly extending tubular hub member of the lower one of said support members which are adapted to have said pin seated therein to prevent relative rotation between said support members.

3. A multisectional plant support and base as defined in claim 1 in which the downwardly extending hub members of the support members are hollow from end to end, said support further comprising a stake means adapted to be driven into a supporting surface, said stake means being insertable through the downwardly extending hub member of at least said lowermost one of said support members to increase the stability of the support, said stake means being structurally independent of said support members.

4. A multisectional plane support and base as defined in claim 1 wherein each said support member further comprises a plurality of elongated, tubular hubs, said support component being oriented normally to the longitudinal axes of and surrounding the area bounded by said hubs, and at least one spoke extending from each of said hubs to said support component and fixing the latter relative to that hub.

* * * * *

UNITED STATES PATENT OFFICE
CERTIFICATE OF CORRECTION

Patent No. 4,048,752                Dated September 20, 1977

Inventor(s) Howard Anderson

It is certified that error appears in the above-identified patent and that said Letters Patent are hereby corrected as shown below:

Column 2, line 49, after "plan" delete --of a second--.

Column 2, line 50, change "asembled" to --assembled--.

Column 3, line 67, change "Futhermore" to --Furthermore--.

Column 4, line 13, change "replaing" to --replacing--.

Signed and Sealed this

Fourteenth Day of March 1978

[SEAL]

*Attest:*

RUTH C. MASON
*Attesting Officer*

LUTRELLE F. PARKER
*Acting Commissioner of Patents and Trademarks*